United States Patent
Schreck

(10) Patent No.: US 8,934,194 B2
(45) Date of Patent: Jan. 13, 2015

(54) SYSTEM AND METHOD FOR MAINTAINING A LOW DENSITY GAS ENVIRONMENT IN A DISK DRIVE

(76) Inventor: Erhard Schreck, San Jose, CA (US)

(*) Notice: Subject to any disclaimer, the term of this patent is extended or adjusted under 35 U.S.C. 154(b) by 0 days.

(21) Appl. No.: 13/282,966

(22) Filed: Oct. 27, 2011

(65) Prior Publication Data

US 2012/0176701 A1 Jul. 12, 2012

Related U.S. Application Data

(60) Provisional application No. 61/431,022, filed on Jan. 9, 2011.

(51) Int. Cl.
*G11B 33/14* (2006.01)
*G11B 25/04* (2006.01)
*G11B 33/12* (2006.01)

(52) U.S. Cl.
CPC ............ *G11B 25/043* (2013.01); *G11B 33/148* (2013.01)
USPC ..................................... 360/97.22; 360/97.12

(58) Field of Classification Search
USPC ................... 360/97.12, 97.18, 97.22
See application file for complete search history.

(56) References Cited

U.S. PATENT DOCUMENTS

| | | | | |
|---|---|---|---|---|
| 4,164,768 A * | 8/1979 | Janssen et al. | ............ | 360/98.03 |
| 4,367,503 A * | 1/1983 | Treseder | .................. | 360/99.18 |
| 4,599,670 A * | 7/1986 | Bolton | .......................... | 360/137 |
| 5,448,429 A * | 9/1995 | Cribbs et al. | .................... | 360/75 |
| 5,877,915 A * | 3/1999 | Ishida | ....................... | 360/99.18 |
| 6,144,178 A * | 11/2000 | Hirano et al. | ................ | 318/476 |
| 6,317,286 B1 * | 11/2001 | Murphy et al. | ............ | 360/97.13 |
| 6,560,064 B1 * | 5/2003 | Hirano | ........................ | 360/97.12 |
| 6,785,089 B2 * | 8/2004 | Bernett et al. | ............. | 360/97.22 |
| 6,819,517 B2 * | 11/2004 | Fioravanti et al. | .............. | 360/75 |
| 6,999,262 B2 * | 2/2006 | Han et al. | ........................ | 360/75 |
| 7,064,920 B2 * | 6/2006 | Fujiwara et al. | ........... | 360/97.18 |
| 7,199,963 B2 * | 4/2007 | Fukushima | ...................... | 360/75 |
| 7,218,473 B2 * | 5/2007 | Bernett et al. | .............. | 360/97.22 |
| 7,353,527 B2 * | 4/2008 | Preis et al. | .................... | 720/651 |

(Continued)

FOREIGN PATENT DOCUMENTS

JP 61063990 A * 4/1986
JP 62060182 A * 3/1987

(Continued)

OTHER PUBLICATIONS

English-machine translation of JP 05-062446 A to Kono et al., published on Mar. 12, 193.*

*Primary Examiner* — Will J Klimowicz
(74) *Attorney, Agent, or Firm* — Colin Fowler

(57) ABSTRACT

A system and method for decreasing power consumption of hard disk drives through use of an external atmosphere of low density gas, such as helium, is described. An environment container reasonably resistant to diffusion and leakage of helium (container) is erected around an existing hard disk array or server, wherein a helium mixture is pumped into the container. The helium mixture within the container is maintained at a specified concentration via proper tubing and valves which may be manually or automatically controlled. The actual concentration need not be very pure in order to achieve reduced drag over the disks in each of the hard disk drives, thereby achieving reduced power consumption. The environment container is stand alone from the hard disk drives used such that an altered hard disk apparatus is unnecessary.

12 Claims, 11 Drawing Sheets

(56) References Cited

U.S. PATENT DOCUMENTS

| | | | |
|---|---|---|---|
| 7,362,565 B2 * | 4/2008 | Imblum | 361/679.33 |
| 7,398,590 B1 * | 7/2008 | Mann et al. | 29/603.03 |
| 7,408,737 B2 * | 8/2008 | Fukushima et al. | 360/97.16 |
| 7,466,514 B2 * | 12/2008 | Brown et al. | 360/97.16 |
| 7,538,972 B2 * | 5/2009 | Burts-Cooper et al. | 360/97.22 |
| 8,199,425 B1 * | 6/2012 | Gustafson et al. | 360/97.12 |
| 8,432,700 B2 * | 4/2013 | Katakura et al. | 361/732 |
| 2002/0149871 A1 * | 10/2002 | Tanaka | 360/69 |
| 2003/0026033 A1 * | 2/2003 | Fioravanti et al. | 360/75 |
| 2003/0214748 A1 * | 11/2003 | Fioravanti | 360/75 |
| 2005/0068666 A1 * | 3/2005 | Albrecht et al. | 360/97.02 |
| 2006/0061955 A1 * | 3/2006 | Imblum | 361/685 |

FOREIGN PATENT DOCUMENTS

| | | | |
|---|---|---|---|
| JP | 62071078 A | * | 4/1987 |
| JP | 62175986 A | * | 8/1987 |
| JP | 62175988 A | * | 8/1987 |
| JP | 62257696 A | * | 11/1987 |
| JP | 62271284 A | * | 11/1987 |
| JP | 62279591 A | * | 12/1987 |
| JP | 03203011 A | * | 9/1991 |
| JP | 03237674 A | * | 10/1991 |
| JP | 05062446 A | * | 3/1993 |
| JP | 08161881 A | * | 6/1996 |
| JP | 2009199650 A | * | 9/2009 |
| JP | 2010049763 A | * | 3/2010 |

* cited by examiner

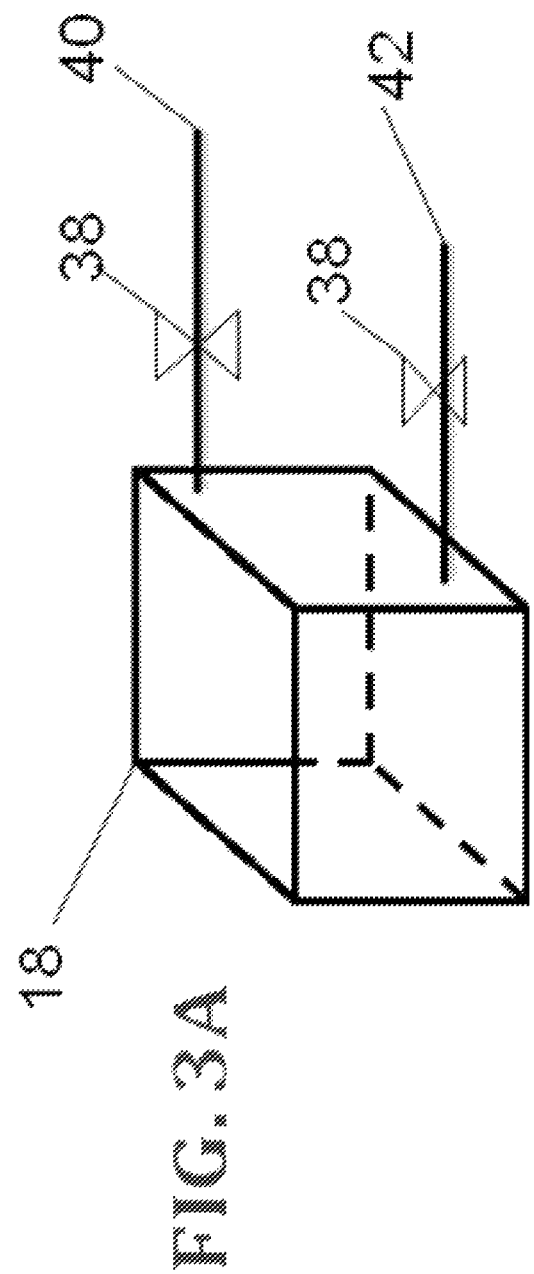

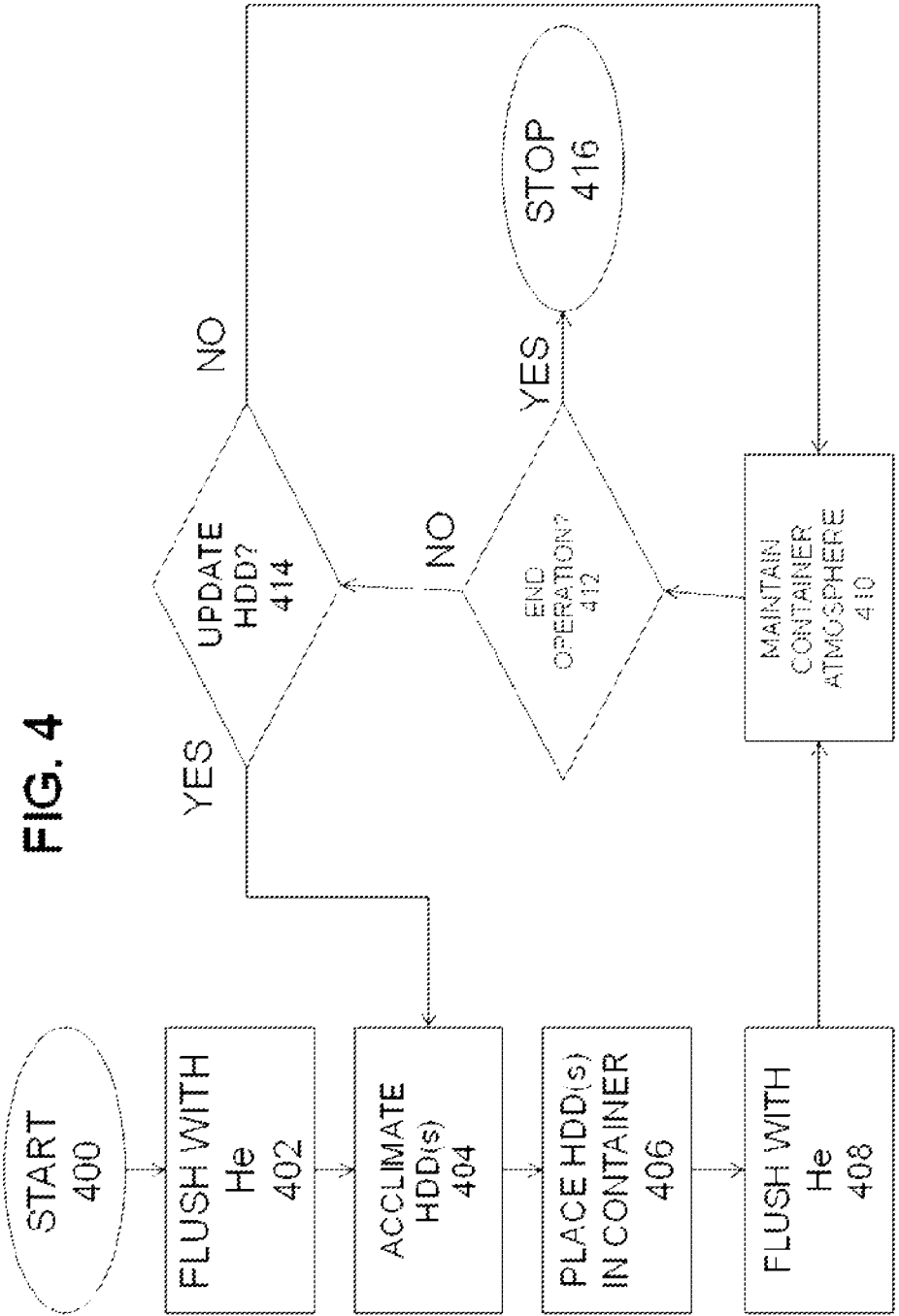

SYSTEM AND METHOD FOR MAINTAINING A LOW DENSITY GAS ENVIRONMENT IN A DISK DRIVE

CLAIM FOR PRIORITY

The present invention claims priority to U.S. provisional patent application No. 61/431,022, filed on Jan. 9, 2011, by the inventor of the same name.

FIELD OF THE INVENTION

The present invention relates to the field of electronic data storage and hard disk drive performance. The present invention more particularly relates to creating an atmosphere of low density gasses such as helium or helium mixtures to lower the power consumption of the drive or drives.

BACKGROUND OF THE INVENTION

Presently many organizations have a need for storing large quantities of data, to address this need, organizations will acquire massive disk drive arrays which each require a substantial amount of power to operate. Due to this, these organizations amass considerably large power costs.

In general, the majority of hard disk drives (HDD) are operated in a standard air (nitrogen, oxygen and water vapor mixture) atmosphere. Spinning disks in HDDs at high RPMs against the friction of an air atmosphere is what drives power costs and is largely inefficient. By running the HDD in an atmosphere which is less dense, such as an atmosphere composed of helium or a helium mixture, friction on the disk is reduced thereby causing the disk to require less power in order to spin at a similar rate.

In using a lower density atmosphere to reduce power costs, maintaining helium or a helium mixture inside the drive rather than a standard air mixture at a reasonable cost can pose additional problems. If the HDD is to be sealed, such that it maintains its own atmosphere, the drive will be prone to pressure differences between inside and outside the drive which produces mechanical stress that requires a more robust mechanical design. An additional problem arises when preventing leaking of internal helium during the operating life of the HDD (5 years). Special metal seals or welding have to be used to seal the drive properly.

Due to this all drives contain a breather hole which equalizes pressure inside and outside of the drive. However, a breather hole allows gas exchange and the helium would diffuse out after a relatively short period. Prior art has addressed this problem by welding the drive shut or adding metal seals. Additionally to withstand the potential pressure differences between inside and outside of the drive, prior art has mechanically reinforced the drive case in order to avoid warping of the critical precision drive mechanics. However, these prior techniques all call for heavy modification of production lines.

Accordingly, there is a need for an improved system that can effectively supply a HDD with a low density gas, such as helium, during use at low cost involving little to no changes to present production lines. The present invention provides a solution to this and other problems, and offers other advantages over the prior art.

BRIEF SUMMARY OF INVENTION

This and other objects of the present invention are made obvious in light of this disclosure, wherein methods and systems for maintaining a helium mixture environment within a hard disk drive (HDD) are described.

According to a first aspect of the system of the present invention, an external environment container reasonably resistant to diffusion and leakage of helium (container) is erected around a hard disk array or server, wherein a helium mixture is pumped into the container. The helium mixture and uniformity within the container is maintained at a specified concentration via proper tubing, fans, heat sinks and valves which may be manually or automatically controlled. Before being placed in the container, the HDDs in the array tower will be acclimated to a low density environment with separate helium filled enclosures and equalize via a standard breather hole that all commercial drives posses; thereby filling with a certain concentration of helium which closely matches the helium mixture in the container. The actual concentration of helium need not be very pure in order to achieve reduced drag over the disks in each of the HDDs, thereby achieving reduced power consumption.

According to a first preferred embodiment of the method of invention, the container begins full of air. A helium mixture is injected into the container, as pressure builds inside the container an over pressure valve is opened preferably at the base of the container allowing gas to escape easily. The container, being reasonably sealed, does not allow a significant amount of ambient air to enter, thus eventually all that remains within the container is a helium mixture. The helium mixture can be set for a constant or intermittent flow. The pre-acclimated hard drive array is then placed in the container, which will lose some helium mixture, and take on some air in the process. The container is sealed and the helium mixture flushes out the air over time thereby maintaining the helium mixture atmosphere.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Pat. No. 6,785,089 (Inventors: Bernett, et al.; Issued on Aug. 31, 2004), titled "Disc Drive Gas Supply System"; U.S. Pat. No. 6,144,178 (Inventors: Hirano, et al.; Issued on Nov. 7, 2000), titled "Disk Drive With Controlled Reduced Internal Pressure"; U.S. Pat. No. 7,218,473 (Inventors: Bernett, et al.; Issued on May 15, 2007), titled "Two-Stage Sealing Of Data Storage Assembly Housing To Retain A Low Density Atmosphere"; U.S. Pat. No. 7,796,356 (Inventors: Fowler, et al.; Issued on Sep. 14, 2010), titled "Head Integrated Touchdown Sensor For Hard Disk Drives"; and U.S. Pat. No. 7,800,858 (Inventors: Bajikar, et al.; Issued on Feb. 21, 2010), titled "Differential Head Integrated Touchdown Sensors For Hard Disk Drives".

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE DRAWINGS

The subject invention will be more fully understood and appreciated from the following detailed description, taken in conjunction with the drawings in which:

FIG. 3A is an alternate embodiment of a gas inlet system.

FIG. 4 is a flow chart of a preferred method of operations for the environmental system of FIG. 2;

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless expressly defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The term, "helium mixture" is to be expressly defined for the purposes of this disclosure as any of the following: pure atomic helium, crude helium, and an air/helium mixture or gas/helium mixture composed of at least 50% helium by volume which can also contain typical environmental gas contaminants like moisture, carbon dioxide, sulfur compounds, and heavier hydrocarbons as also found in crude helium.

Figure 1:
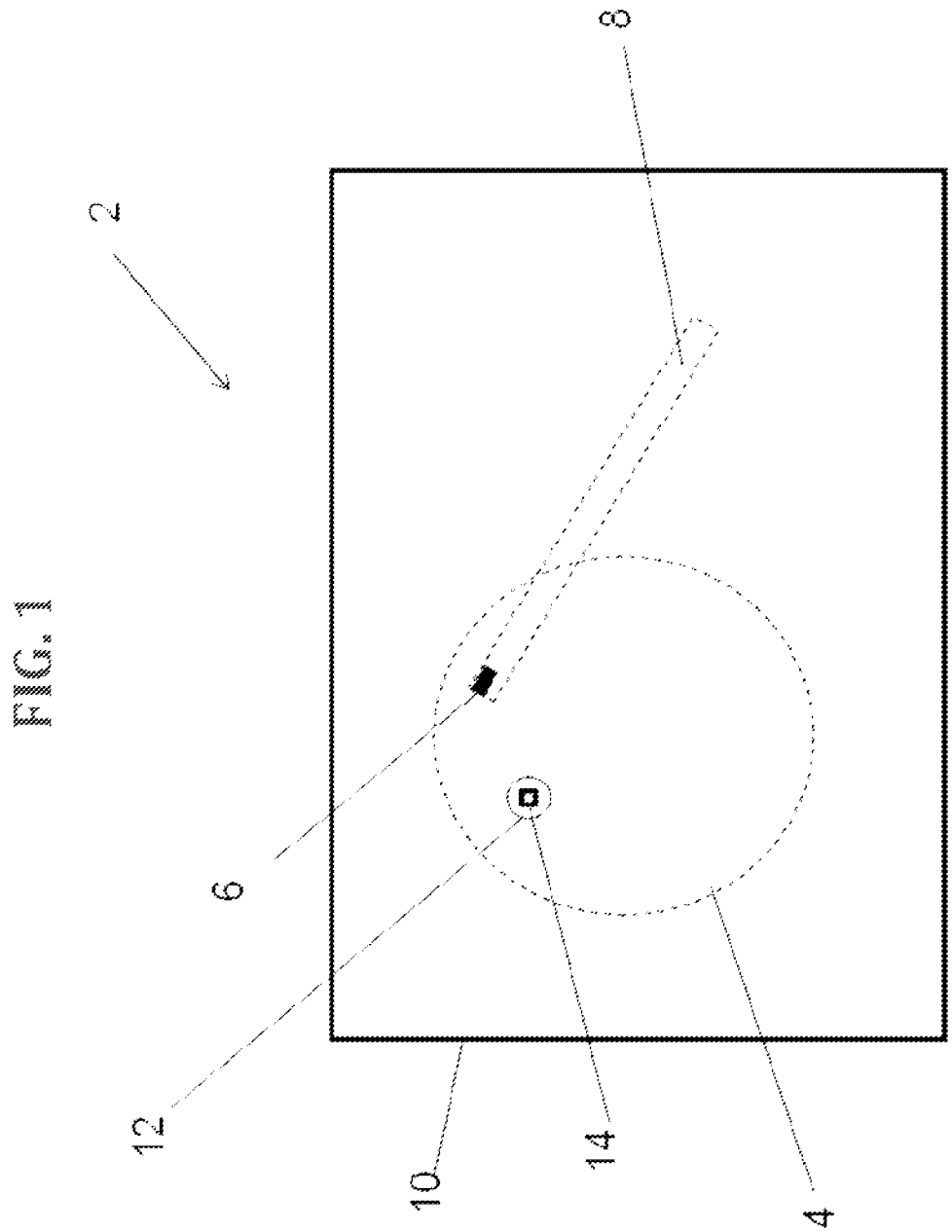
FIG. 1 is a simplified block diagram of a standard commercial hard disk drive, in accordance with an embodiment of the subject invention.

Referring now to FIG. 1, a block diagram of a hard disk drive (Hereafter "HDD") 2. Standard commercial HDDs 2 presently all include at least one disk 4, each with a matching head 6 poised on an arm controlled by an actuator 8. These components are housed within a casing 10 which is effectively enclosed except a small breather hole 12 on the surface which allows for gas exchange inside and outside of HDD 2 to avoid pressure differences. The breather hole 12 contains a particle filter 14 to keep inflow gas clean.

Figure 2:
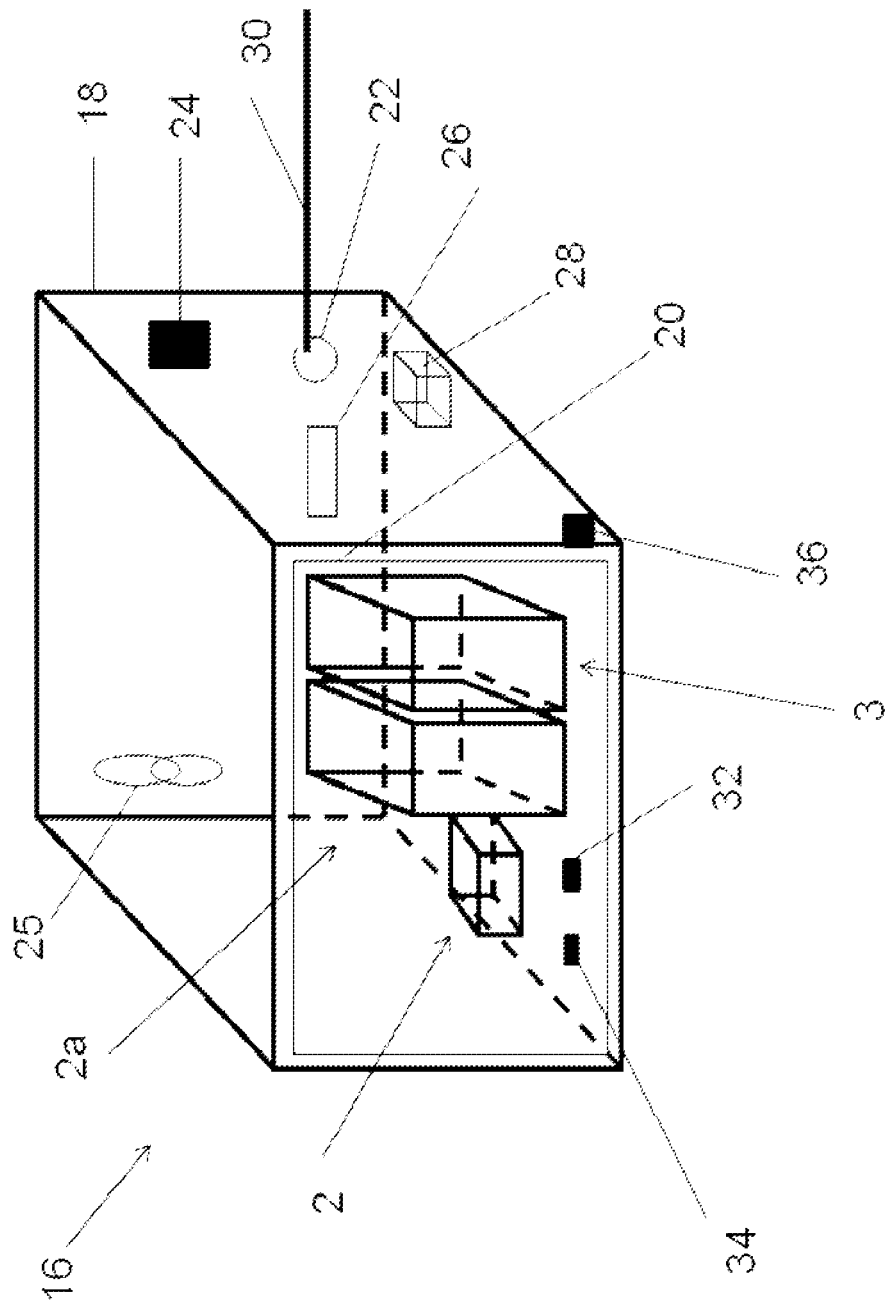
FIG. 2 is a an isometric block diagram of the invented external environmental system containing one or more disk drives.

Referring now to FIG. 2, a diagram of the invented external environmental system (hereafter "environmental system") 16. The environmental system 16 comprises a substantially air-tight, to completely air-tight container 18 with one or more hatches 20, a gas inlet 22, a heat exchanger 24, an internal fan 25, an electrical/data inlet 26, a humidifier 28, a gas supply 30, an optional pressure sensor 32, an optional gas mixture sensor 34 and an over pressure valve 36. Placed inside the environmental system 16 would be one or more HDDs 2, a HDD array 2a containing a plurality of HDDs 2 or server 3 which would comprise at least one HDD 2 and a controller. The substantially air-tight container (hereafter "container") 18 would be constructed of sheet metal, plastic, plexiglass, or any other suitable material known in the art such that, when closed, the container 18, is ideally sealed from ambient air transfer; however, marginal air seepage would still be acceptable. Actual construction and air seal strength would depend on cost of materials and many on-site variables. The container 18 need not be rigid in form, and could be constructed as a flexible bag in character as long as other specified characteristics were adhered to. The container 18 need not be vacuum tight and depending on material used or strength of the seals, some helium gas may diffuse out. Depending on the effectiveness the seal on the container 18, it is foreseen that a completely air tight container 18 would not take on additional air, but would still lose helium mixture through diffusion. Helium mixture loss would be detected by either the optional pressure sensor 32 or a gas mixture sensor 34 and would then be replenished by the gas supply 30. When the pressure within the container 18 becomes greater than that outside the environmental system 16, an over pressure valve 36 would open, allowing gas to escape thus lowering the pressure inside the environmental system 16.

The hatch 20 or the container 18 should be sealed with a rubber o-ring like device, a viton seal or any other suitable material known in the art such that when closed the seal prevents at least a substantial majority of air seepage. In order to maintain a helium mixture atmosphere within the container 18 while access to objects inside the environmental system 16 is required via the hatch 20, the container 18 could be configured to maintain an internal pressure slightly above ambient atmosphere which would be established by the gas supply 30 and adding additional resistance to the over pressure valve 36. The increased internal pressure would create an outward diffusion of gas for a short period until the pressure equalized such that limited ambient air would be able to enter the environmental system 16. Additionally rather than a single hatch 20, several smaller hatches 20 could be utilized one or more at a time in order to expose less open surface area when accessing the environmental system 16. Alternatively or in addition to the aforementioned method, the environmental system 16 could be flushed with helium mixture from the gas supply 30 every time access was needed.

The electrical/data inlet 26 would be constructed such that it would accommodate the proposed contents of the environmental system 16. The electrical/data inlet 26 would be substantially air tight similar to other apertures of the container 18. In order to achieve this, an electrical and data BUS could be sealed into the wall of the container 18 or hatch(es) 20 and the HDD(s) 2 inside would connect to the internal end of the BUS and the external end would connect to a power source and the destination of the data stored in the HDD(s) 2.

The heat exchanger 24 and internal fan 25 are used to maintain a specified temperature and uniform mixture of atmosphere inside the environmental system 16. The heat exchanger 24 would take on one of many embodiments such that it would suitably dissipate heat created within the environmental system 16. Gasses such as helium create less friction with the moving parts of a HDD 2 and thus will contribute to HDDs 2 generating less heat, further Helium changes temperature much less, requiring less heat dissipation. Refer to table 1;

TABLE 1

| | Helium | Air | Helium is |
|---|---|---|---|
| Density (gm/cm^3) | 1.70E−04 | 1.20E−03 | 7× lower |
| Viscosity (µPoise) | 194 | 182.7 | similar |
| Thermal Conductivity (W/cm-K) | 1.5 | 0.26 | 6× better |

Some suitable heat exchange methods would include systems similar to either an automobile radiators or a refrigerator. Another example of a suitable heat exchanger would be a cooling fin affixed to the surface of the container to increase said container's surface area, thereby supplying more material to absorb and subsequently dissipate heat to the exterior air. Other systems could also be feasible as long as they were able to adequately dissipate the heat generated by the chosen number of HDDs 2 to be kept within the environmental system 16. The internal fan 25 would be affixed to either the top of the container 18 preferably facing down or the base of the container 18 preferably facing up. The optimal positioning on either surface would vary depending on specific construction of the container 18. The purpose of the internal fan 25 would be to mix the lighter low density gas (helium mixture), with the heavier gasses present (such as air) which would otherwise gradually settle on the bottom of the container 18. Natural convection caused by the heated drives will also contribute to the mixing.

The humidifier 28 is used as a result that standard commercial HDDs 2 work better with some humidity. An environment of less than 10%rh can cause problems in HDDs 2 currently in production. As a result that bottled helium is generally very dry, a humidifier is necessary to keep humidity in a range favorable for HDD 2 running conditions, between 10%-60%rh. Future HDDs may function effectively without humidity; this would negate the need for a humidifier in the present invention.

Figure 3:
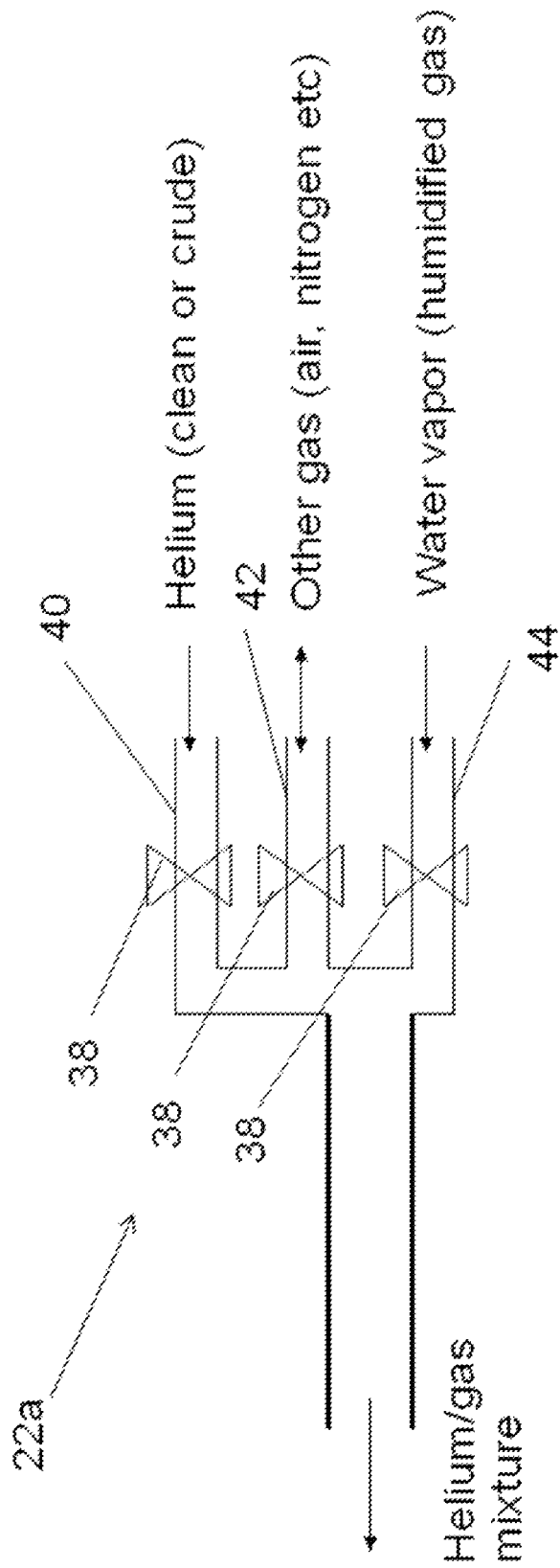
FIG. 3 is a cross section of an alternate embodiment of a gas inlet.

Referring now to FIG. 3, a cross section of an alternate embodiment of a gas inlet 22a. The alternate gas inlet 22a would include several valves 38. The valves 38 could be controlled either manually or electronically. Each valve 38 would restrict access to one of three tubes 40, 42, 44 some of which being optional. The low density gas tube 40 would allow for the injection of a low density gas, such as a helium mixture, to the environmental system 16 via the gas supply 30. The heavy gas tube 42 is optional and would allow for the flushing of a certain amount of a heavier gas, such as ambient air, and could be used as a cost saving measure, among other uses. The third tube, the humidity tube 44, is optional and would replace the humidifier 26 while performing the same purpose. Referring to FIG. 3A, a duel gas inlet system is shown. In this case the low density tube 40 would be placed at the top of the container 18 and a high density gas tube 42 would be preferably placed at the base of the container 18 such that these lines could be operated independently. Further the high density gas tube 42 would be affixed to a vacuum pump. The heavier air could be drained from the container 18 from the base while the lighter helium mixture was flushed in from the top. This alternate embodiment would alleviate much of the need for the internal fan 25.

Referring now to FIG. 4, a flow chart of a preferred method of environmental system 16 operations which may be carried out in any order of the recited events which is logically possible. First, the empty container 18 is sealed and through the gas inlet 22, a low density gas such as a helium mixture is flushed into the environmental system 16. As gas pressure builds inside the environmental system 16 an over pressure valve 36 at the base of the container 18 releases internal gasses, including air. During the low density gas flush, no substantial amount of air is replaced within the container 18 and the environmental system gradually attains a low density atmosphere such as an atmosphere composed of helium mixture (402). Next, the HDDs 2 that will be placed within the environmental system 16 are acclimated to a low density environment (404). The HDDs 2 are then placed inside the environmental system 16 (406). After the environmental system 16 is sealed again, an additional low density gas flush would occur to restore the gas lost while inserting the HDD(s) 2 (408). The environmental system 16 then maintains desired environmental settings using some or all of the local instruments and devices: a gas concentration sensor 32, a pressure sensor 34, heat exchanger 24, the internal fan 25, the humidifier 28, the over pressure valve 36 and the gas inlet 22. The gas supply 30 would be configured to flush the container 18 with the low density gas such as a helium mixture by a constant, intermittent or instrument regulated flow to maintain the desired atmosphere in the environmental system 16 (410). While in use, the process may be ended at the discretion of a user (412). At some point it is likely that a user will want to change out one or more of the HDDs 2 that reside within the environmental system 16, in the event of this, the process begins again at the acclimation of the replacement HDD 2 (414).

Figure 5:
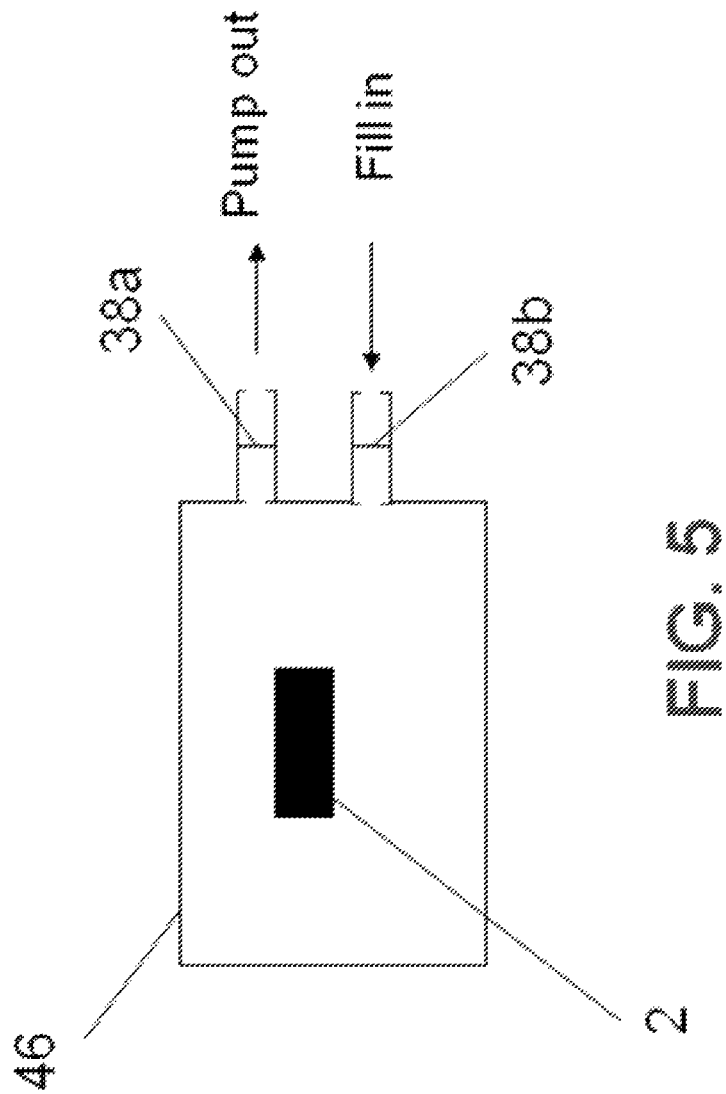
FIG. 5 is a block diagram of the apparatus involved in with preemptive acclimation of a hard disk drive.
Figure 6:
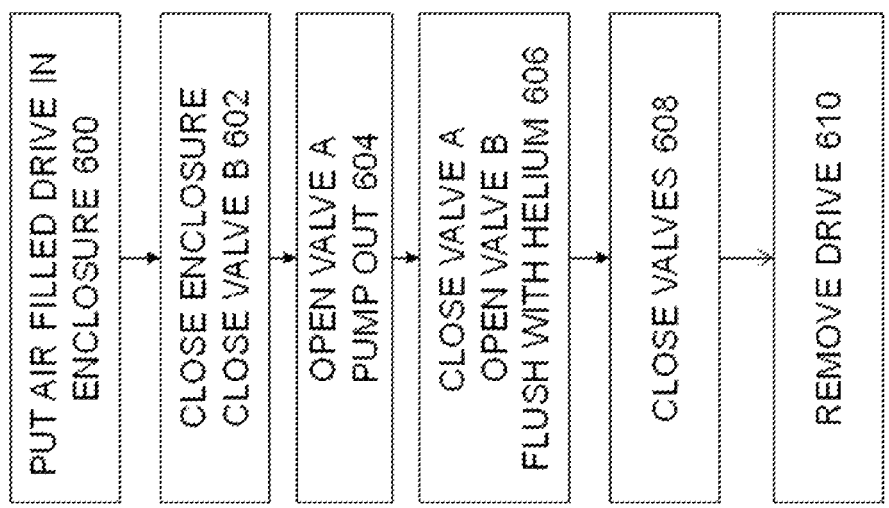
FIG. 6 is a flow chart of the process involved with preemptive acclimation of a hard disk drive using the apparatus of FIG. 5.

Referring to FIG. 5 and FIG. 6, which are apparatus and method for preemptive acclimation of a HDD 2 to a low density environment. The apparatus involved includes an at least substantially air tight enclosure 46 in which a non-operational HDD 2 may be placed. The enclosure 46 has two valves 38, a first valve 38a used for pumping air out and a second valve 38b for pumping a low density gas in. In operation, a HDD 2 which is currently not in operation is placed within the enclosure 46 (600). The second valve 38b of the enclosure 46 is closed (602). The ambient air is vacuumed from the enclosure 46 through the first valve 38a (604). The first valve 38a is then closed and the second valve 38b is opened and the enclosure 46 is flushed with a low density gas such as a helium mixture (606). Both valves 38a, 38b are then closed and time is given to allow the HDD 2 to fill with the low density gas (608). The HDD 2 is then removed from the enclosure 46 and placed within the environmental system 16. If there is considerable time between removal and placing inside the environmental system 16, the breather hole 12 can covered with suitable adhesive covering during the wait to prevent unnecessary helium mixture leaking (610).

Figure 7:
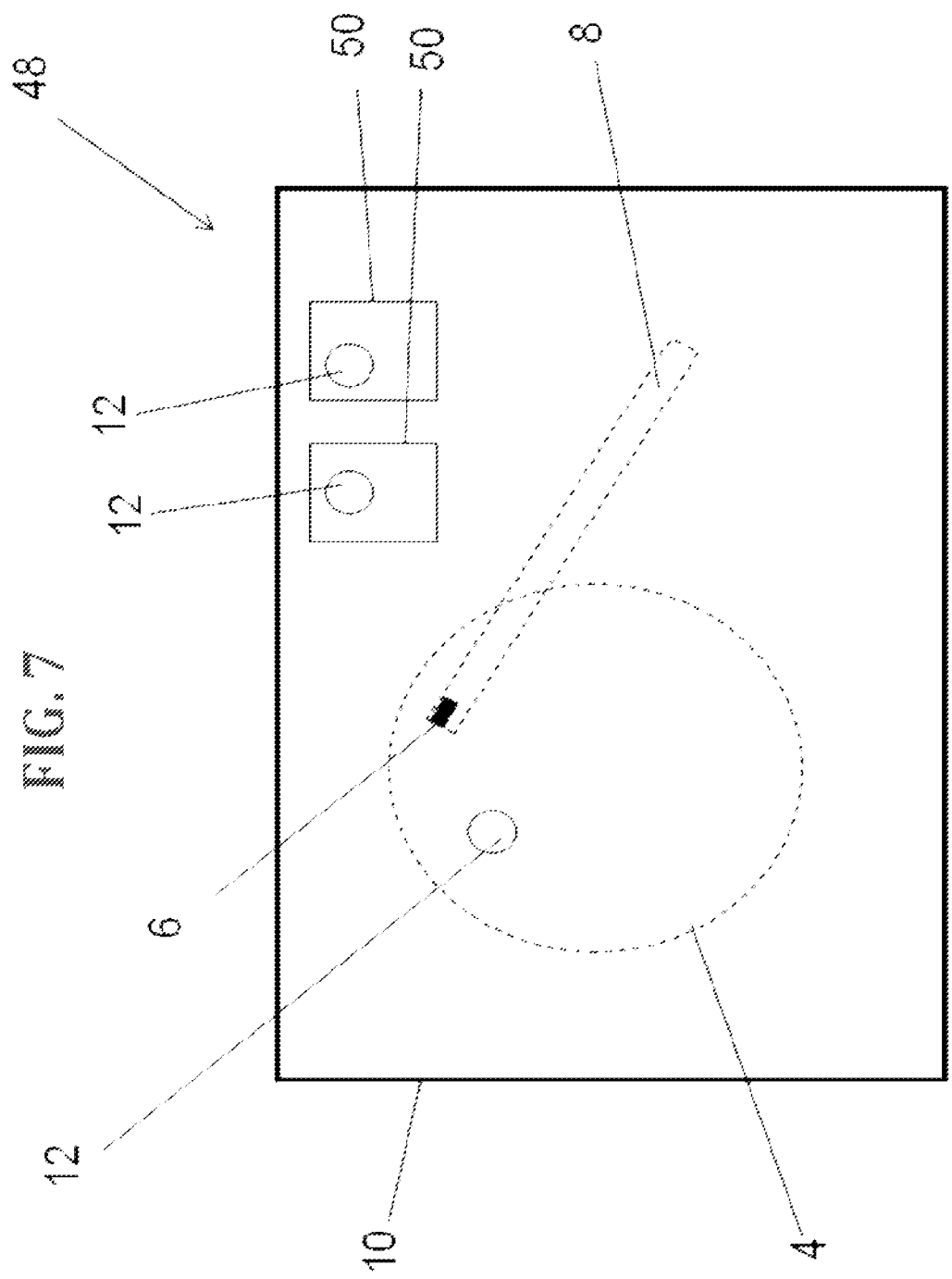
FIG. 7 shows a modified hard disk drive which could acclimate to a new environment more quickly than a standard drive.

Referring now to FIG. 7, which is a block diagram of a modified hard disk drive (modified HDD) 48. The modified HDD 48 has one or more additional breather holes 12 such that when placed in a new atmosphere, the modified HDD 48 will fill with the ambient gasses more quickly. Due to the resultant increased air flow a more robust chemical and particle filter 14 could optionally be used. These additional holes can be blocked up with a suitable adhesive covering 50 when the environment the modified HDD 48 operates without a need for additional gas exchange. The placement of the additional holes 12 can be positioned to target particular pressure zones within a modified HDD 48. One breather hole 12 may be positioned such that it is over a low pressure zone and a separate breather hole 12, would be positioned over a high pressure zone. With this configuration ambient gasses would be drawn through the internal portion of the modified HDD 48 further increasing the rate the drive would fill with ambient gas.

Figure 8:
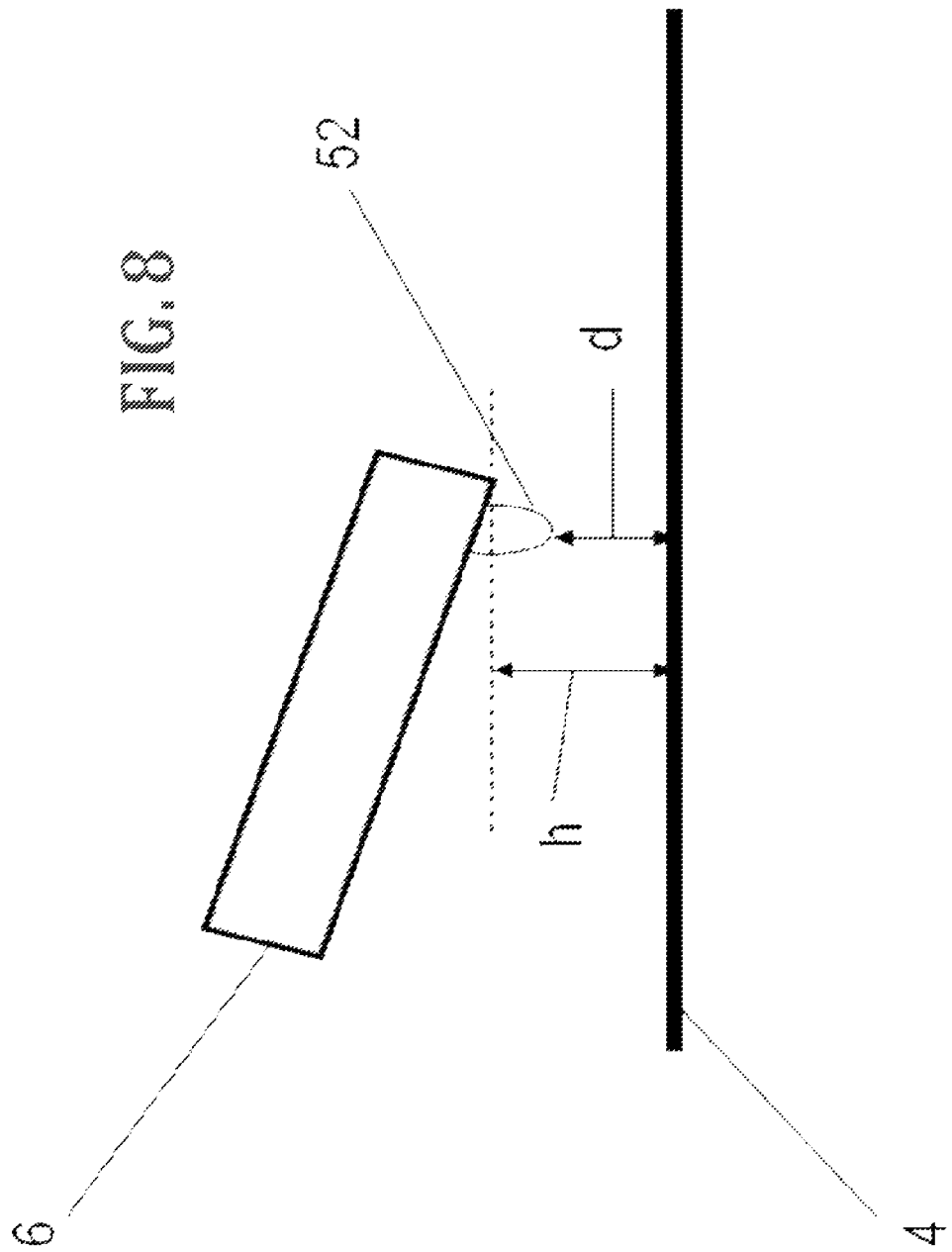
FIG. 8 shows side view of a sample flying height of a head in a disk drive.
Figure 10:
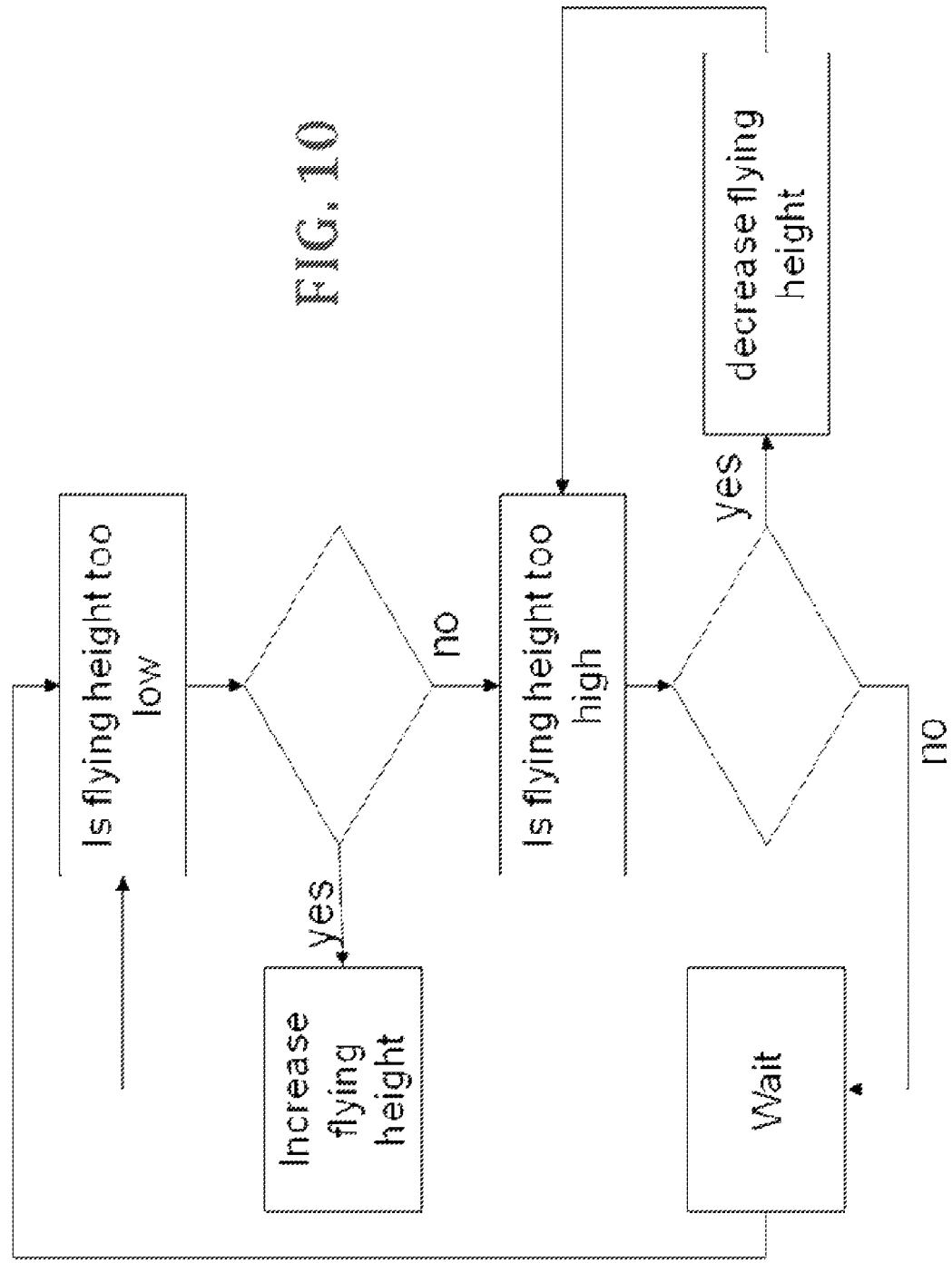
FIG. 10 is a process taken by a flying height monitor of the head of a disk drive.

Referring now to FIG. 8 which shows a side view of a sample flying height of a head 6 in a HDD 2. While running in a low density system the head 6 of a HDD 2 will have a lower flying height h, and in turn a smaller clearance d. Generally all drives address this issue by detecting touchdowns or near touchdowns, measuring or approximating the distances h and d, then cooling or heating the protrusion 52 as necessary to change the distance d. This method is shown in FIG. 10. The flying height h would be greatly altered by a moderate to substantial change in environment of the HDD 2. Great changes in flying height can cause needless touchdowns which cause damage to the disc 4 or head 6, and thus avoiding moderate to substantial transition phases would be ideal for an operator of the invented environmental system 16. It is thus important for a user to minimize time in which the environmental system is exposed to external conditions such that transition phases remain small or negligible. Subsequent to this disclosure, HDDs 2 will have an improved ability to detect flying height changes as a result of transitions in environment, thus the care required by a user will decline over time.

Other changes that could potentially be made to HDD 2 design would include; the airbearing design could be optimized for operating in a helium mixture environment; the storage density can be increased because the low density environment allows for higher track densities due to less non repeatable run out, only the drives 2 firmware needs to have the provision to make use of this capability; and due to low density environment, drives 2 could spin at higher RPM than in ambient air which would offset some of the power savings but still be a beneficial application for the above mentioned environmental system 16.

Figure 9:
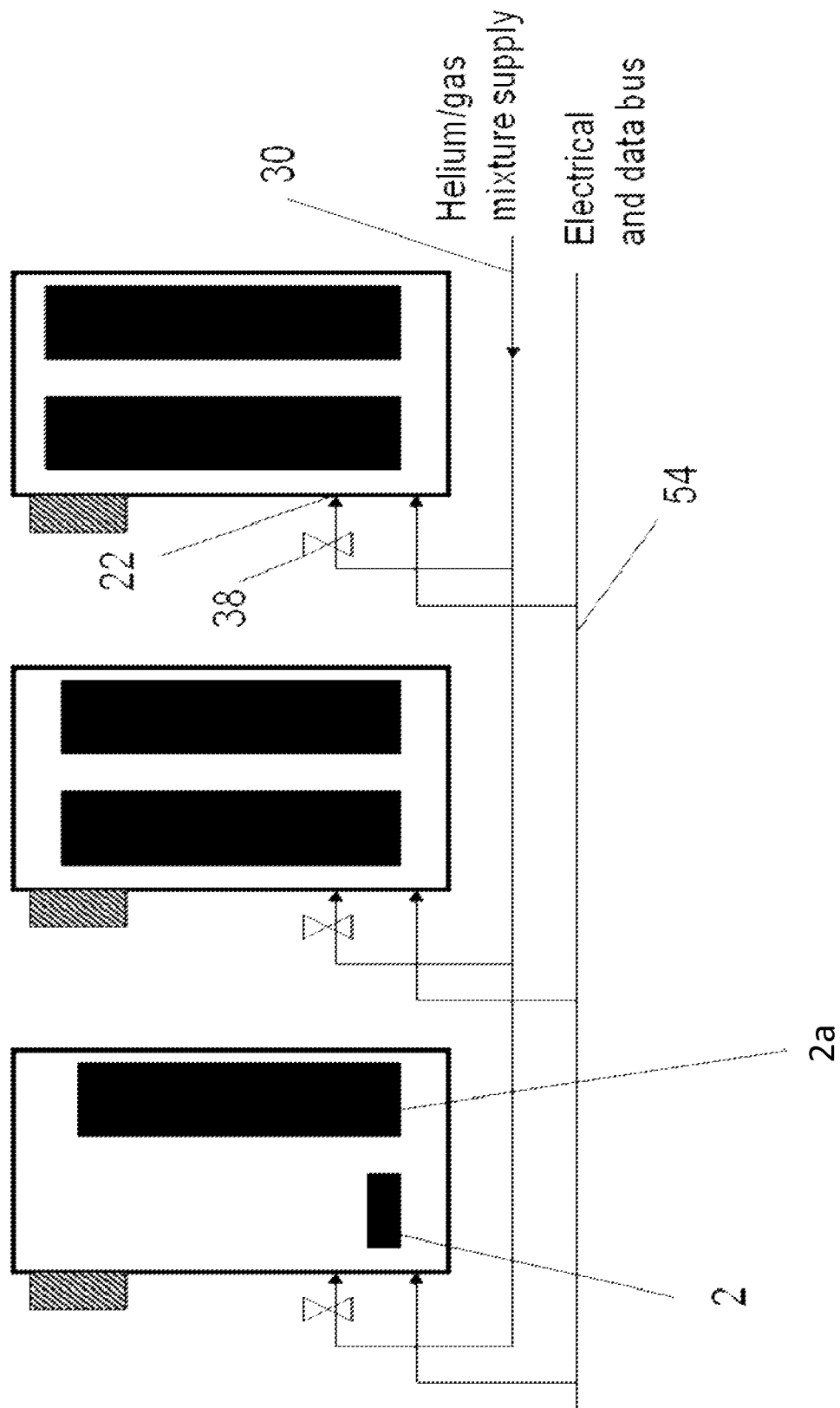
FIG. 9 is a plurality of invented environmental systems configured in series.

Referring to FIG. 9, which is a plurality of environmental systems 16. The invented environmental system can be used in series with others using the same gas supply 30 and data/electrical bus 54. In series, the invented environmental system 16 each containing HDD arrays 2a, or servers 3 can save on power consumption over a much larger scale.

The foregoing disclosures and statements are illustrative only of the present invention, and are not intended to limit or define the scope of the present invention. The above description is intended to be illustrative, and not restrictive. Although the examples given include many specifics, they are intended as illustrative of only certain possible applications of the present invention. The examples given should only be interpreted as illustrations of some of the applications of the present invention, and the full scope of the Present Invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above.

I claim:

1. An environmental system, comprising:
    a container, the container enclosing a space wherein said container allows nominal gas transfer between the space and the environment outside;
    at least one hard disk drive ("HDD"), the at least one HDD contained within the space enclosed by the container and is removable from said space;
    a means to direct system external power to the at least one HDD sufficient to sustain operation;
    a means for data transfer, the means for data transfer providing the at least one HDD the ability to send and receive data from within the container; and
    a gas exchange system coupled to the container such that the gas exchange system may control an atmosphere within the container, wherein the atmosphere of the container is composed substantially of a low density gas, and the gas exchange system includes an over pressure valve positioned at the base of the container.

2. The environmental system of claim 1, wherein the low density gas is helium mixture.

3. The environmental system of claim 1, wherein the system further comprises a heat exchanger which controls the ambient temperature inside the container.

4. The environmental system of claim 1, wherein the gas exchange system coupled to the container comprises a gas supply, a gas inlet and a set of valves.

5. The environmental system of claim 4, wherein the gas exchange system is regulated by a pressure sensor.

6. The environmental system of claim 4, wherein the set of valves is controlled electronically.

7. A plurality of the environmental systems of claim 4, wherein a single gas supply provides low density gas to each environmental system.

8. The environmental system of claim 1, wherein the container further comprises an internal fan.

9. The environmental system of claim 1, wherein the at least one HDD includes two or more breather holes.

10. The environmental system of claim 1, wherein the at least one HDD comprises a HDD array.

11. A system, comprising:
    a container, the container enclosing a space wherein said container allows nominal gas transfer between the space and the environment outside;
    at least one hard disk drive (HDD);
    an acclimation chamber, separate from said container, for preparing said HDD, the at least one HDD insertable within the acclimation chamber and subsequently removable from, wherein an atmosphere inside the at least one HDD is altered to that of a low density gas via diffusion in the acclimation chamber;
    a gas exchange system coupled to the container such that the gas exchange system may control an atmosphere within the container, wherein the atmosphere of the container is composed substantially of a low density gas, the container such that the at least one HDD may be removeably placed inside and operate in the atmosphere composed substantially of a low density gas;

a means to direct system external power to the at least one HDD sufficient to sustain operation; and a means for data transfer, the means for data transfer providing the at least one HDD the ability to send and receive data from within the container.

12. The system of claim 11, wherein the low density gas is helium mixture.

* * * * *